United States Patent [19]

Lachonius et al.

[11] 4,190,301
[45] Feb. 26, 1980

[54] AXIAL BEARING FOR A ROLLER DRILL BIT

[75] Inventors: Leif Lachonius, Surte; Dieter Becker, Hisings Backa, both of Sweden

[73] Assignee: Aktiebolaget SKF, Goteborg, Sweden

[21] Appl. No.: 874,324

[22] Filed: Feb. 2, 1978

[30] Foreign Application Priority Data

Feb. 16, 1977 [SE] Sweden ............................ 7701680

[51] Int. Cl.² .............................................. E21B 9/10
[52] U.S. Cl. ...................................... 308/8.2; 175/329; 175/330; 308/DIG. 8
[58] Field of Search ............... 308/8.2, 174, DIG. 8, 308/139, 140, DIG. 15, 163, 164, 144, 145, 159, 241; 175/371, 372, 329, 330

[56] References Cited

U.S. PATENT DOCUMENTS

| 630,574 | 8/1899 | Sturtevant | 308/139 |
|---|---|---|---|
| 2,592,277 | 4/1952 | Hammer | 308/8.2 X |
| 2,651,501 | 9/1953 | McMahon | 308/8.2 X |
| 3,127,942 | 4/1964 | Neilson | 175/372 X |

FOREIGN PATENT DOCUMENTS

| 1311854 | 3/1973 | United Kingdom | 308/DIG. 8 |
|---|---|---|---|
| 394539 | 12/1973 | U.S.S.R. | 308/8.2 |

*Primary Examiner*—Douglas C. Butler
*Attorney, Agent, or Firm*—Eugene E. Renz, Jr.

[57] ABSTRACT

An axial thrust bearing for a roller drill bit comprising a pair of one piece diamonds mounted in the axial end face of the journal and the interior of the cutting roller supported for rotation on the journal. Each diamond is mounted on a cup-shaped casing made of a softer metal than the journal and cutting roller. Preferably the confronting engaging bearing surfaces of the diamonds are spherical.

1 Claim, 1 Drawing Figure

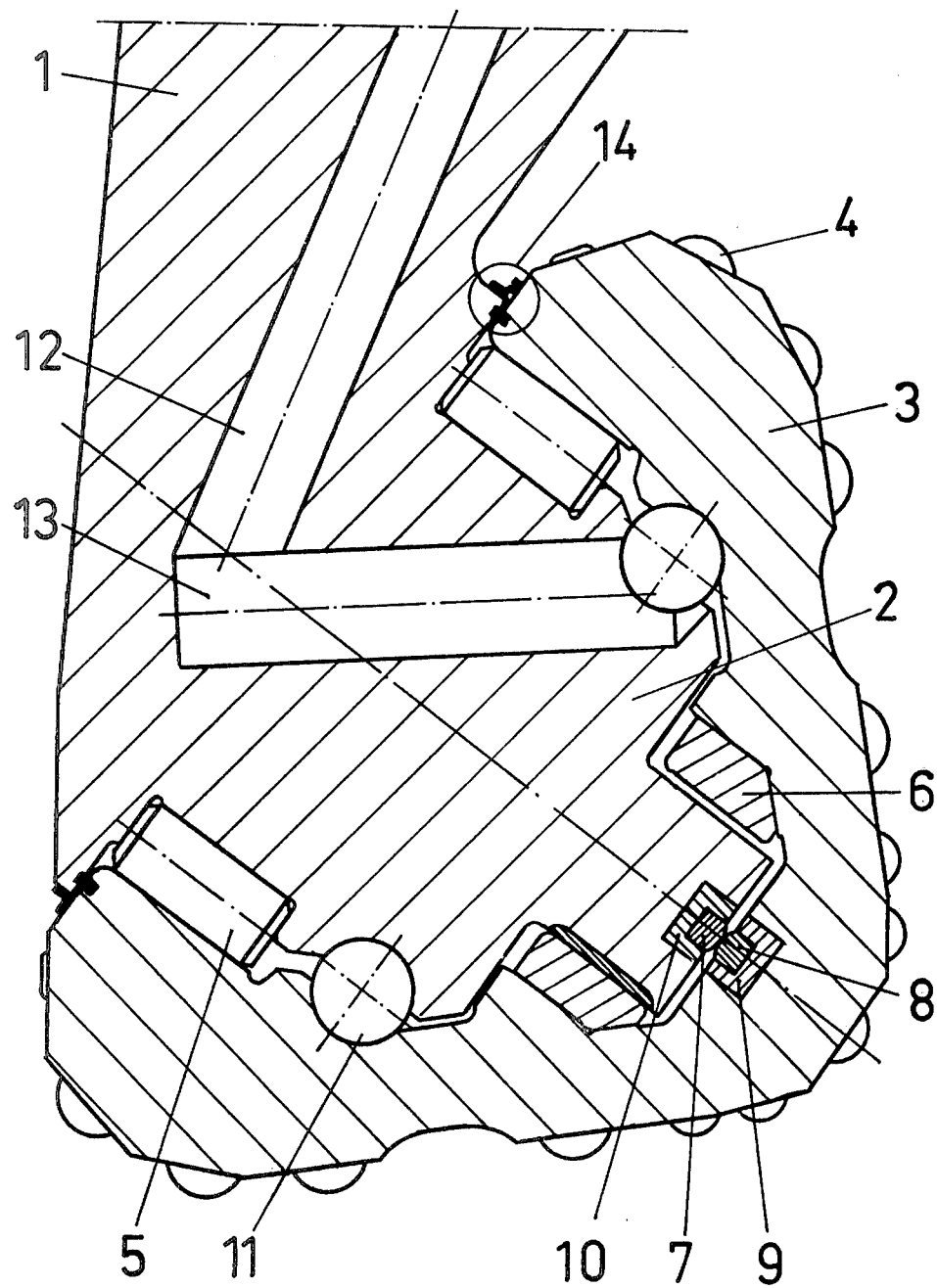

AXIAL BEARING FOR A ROLLER DRILL BIT

BACKGROUND OF THE INVENTION

The present invention refers to an axial bearing for a roller of a roller drill bit.

In a conventional roller drill bit e.g. for blast hole rock drilling the radial forces on the rollers are generally supported by a radial roller bearing and a sliding bush. The axial force is supported by a thrust bearing with a thrust washer. It can be mentioned that the axial force at a 12¼″ drill bit with a rotational speed of 100 rpm amounts to about 40000–70000 N. The thrust bearing is commonly completely unlubricated and it is cooled by means of pressurized air.

In order to improve the service life of the thrust bearing it is earlier known to coat the end surface of the shaft journal on which the roller is arranged with a hard surface material, e.g. Stellite, which can be welded to the shaft journal and thereupon be ground. This end surface cooperates with a bottom surface of an aperture in the roller, which bottom surface is provided e.g. with a washer of highspeed steel, if desired with an insert of silver as a lubricant. These measures, however, do not prevent the hitherto known thrust bearings from having a comparatively short service life. They are rapidly worn out due to the unfavorable service conditions. A common wear is about 2–3 mm in 70 hours. The dimension change will cause large loads on other elements of the bearing assembly for the roller, which elements will be damaged. A high bearing temperature is generated in spite of the cooling with pressurized air flowing through the bearing, as the friction is high. The friction losses can amount to about 1500 W.

The aim of the present application is to provide a thrust bearing of the above mentioned kind, which bearing during operation is exposed to insignificant wear only and where the friction losses are small.

SUMMARY OF THE INVENTION

This is according to the invention obtained thereby that the bearing has been given the features defined in the accompanying Claim 1.

Due to the small friction losses it is possible to discard the pressure air cooling and a seal can be provided for the radial roller bearing, which will improve the service life thereof. As diamond has a much higher modulus of elasticity than steel and also can stand very high contact stresses a contact area of not more than about 12 mm² is required, which corresponds to a circle with a radius of about 2 mm. The friction losses will therefore become low. The diamond has furthermore a very high heat conductivity, which means that a low bearing temperature will be maintained in spite of the fact that the contact area is small, and thus the bearing will have a high effect density, i.e. the friction effect generated per unit of surface area is high. A sliding bearing comprising two cooperating diamond surfaces has a very low wear, also when unlubricated and with impurities present. As it is sufficient to use diamonds of very small volume it is considered that the cost will be competitive as compared to a conventional bearing.

According to one embodiment of the invention diamonds are mounted in a casing which at least partly consists of a material, which is more soft than the material of the roller and of the shaft journal or the like supporting the roller.

BRIEF DESCRIPTION OF THE DRAWING

The invention will hereinafter be further described with references to the accompanying drawing, which shows a portion of a cross-section through a roller drill bit including an axial section of one of the usually three rollers forming part of the drill bit.

DESCRIPTION OF THE ILLUSTRATED EMBODIMENT

The drill bit has a fixed part 1 and extending therefrom is a shaft journal 2, whereupon a roller 3 is supported. The surface of the roller is provided with a number of projecting members 4 of a hard and wear resistant material, which cut rock at the bottom of the drill hole during the rotation of the drill bit and the rotation of the roller 3 on the shaft journal 2, which is caused by the drill bit rotation. The roller is supported on the shaft journal by means of a radial roller bearing unit incorporating a number of bearing rollers 5 which roll against races on the journal and in the bore of the roller 3. The roller is guided radially at the outer part of the journal by means of a bush 6 provided in the bore of the roller and engaging a cylindrical surface on the journal. At the bottom of the bore of the roller 3 and in the end surface of the journal 2 is provided a polycrystalline diamond 7 and 8 respectively. The diamonds have opposed pressure surfaces in least one of which preferably is spherical. It is possible at the manufacture of a synthetic diamond to make a spherical surface thereon. In order to facilitate the mounting and to reduce shock loads the diamonds are advantageously mounted in metal sleeves 9, 10, which can be pressed into apertures in the journal and the roller respectively. The sleeves for the diamonds are preferably enclosed in a layer of metal or similar material which is softer than the material of the roller and the journal.

In order to prevent the roller 3 from sliding off the shaft journal the roller and the journal are provided with opposite grooves, which act as races for a plurality of balls 11. Thes balls are introduced through channels 12, 13 and act to secure the roller from being displaced axially on the journal. The balls are not intended to be exerted to radial loads.

A seal 14 may be provided between the inner end of the cutting roller 3 and the drill bit body 1 to hold lubricant for the bearings.

We claim:

1. A roller drill bit comprising a journal, a cutting roller rotatably supported on said journal by bearing means including an axial bearing comprising a cup-shaped metallic casing of a material softer than the cutting roller and shaft journal mounted in the axial end face of the shaft journal and a cup-shaped metallic casing of a material softer than the cutting roller and shaft journal mounted in the interior of the tip of the cutting roller, a diamond supported in each casing having bearing surfaces in confronting engaging relation, each of said bearing surfaces being spherical.

* * * * *